United States Patent [19]
Jones et al.

[11] Patent Number: 5,186,403
[45] Date of Patent: Feb. 16, 1993

[54] PORTABLE GLASS CRUSHING APPARATUS

[76] Inventors: Calvin B. Jones; Debbie A. Jones, both of 320 Ridgelyn Rd., Calera, Ala. 35040

[21] Appl. No.: 921,630

[22] Filed: Jul. 30, 1992

[51] Int. Cl.$^5$ .................................................. B02C 19/14
[52] U.S. Cl. ........................................ 241/99; 241/100; 248/674
[58] Field of Search .............. 241/99, 100; 248/674, 248/657

[56] References Cited

U.S. PATENT DOCUMENTS

| | | | |
|---|---|---|---|
| 2,558,255 | 6/1951 | Johnson et al. | 241/100 |
| 3,017,226 | 1/1962 | Sloyan | 248/657 |
| 3,756,520 | 9/1973 | Hughes | 241/99 |
| 4,391,413 | 7/1983 | Pack | 241/99 |

Primary Examiner—Mark Rosenbaum
Assistant Examiner—John M. Husar
Attorney, Agent, or Firm—Leon Gilden

[57] ABSTRACT

A receiving container includes a lid plate thereon mounting a cylindrical receiving tube, with the cylindrical receiving tube including rotating blade members to effect crushing of glass jars and the like directed through the receiving tube from a delivery chute, with the delivery chute including a chute cover. The container may be formed of replaceable configuration to permit removal of the lid plate relative to the receiving container for selective filling of a plurality of such receiving containers.

3 Claims, 4 Drawing Sheets

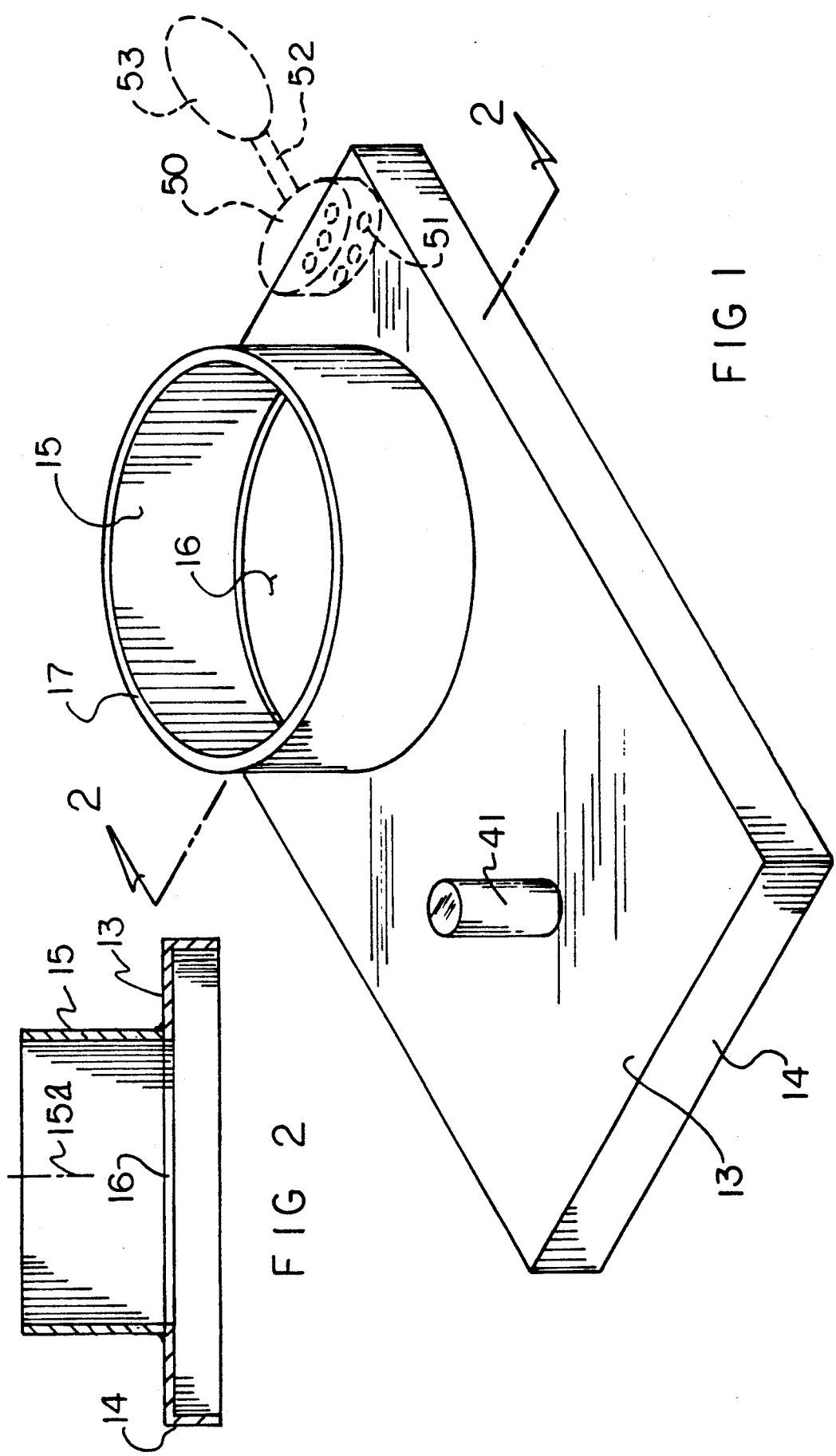

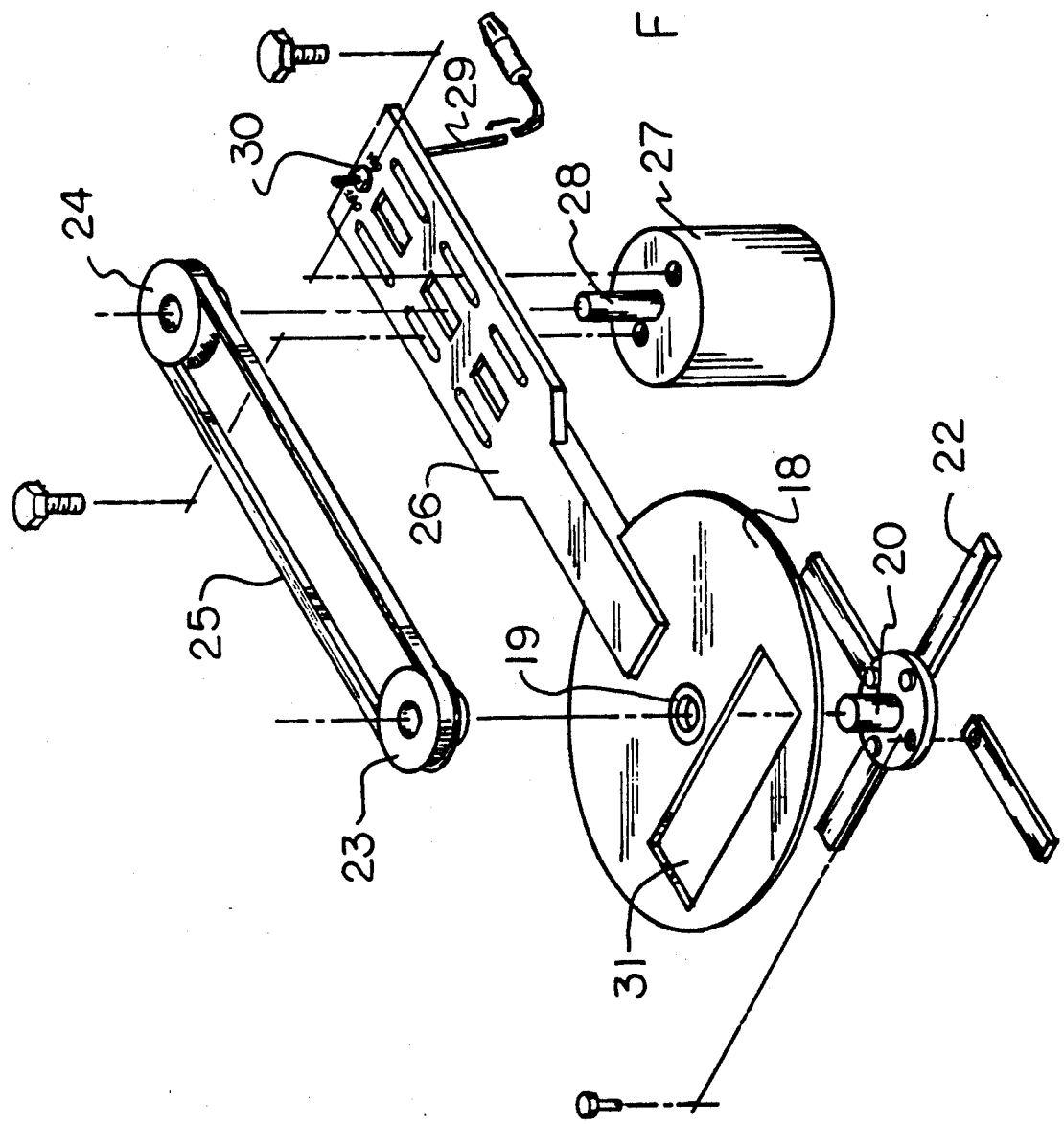

PORTABLE GLASS CRUSHING APPARATUS

BACKGROUND OF THE INVENTION

1. Field of the Invention

The field of invention relates to glass crushing apparatus, and more particularly pertains to a new and improved portable glass crushing apparatus wherein the same is arranged for mounting to a receiving container.

2. Description of the Prior Art

Glass crushing apparatus of various types have been utilized throughout the prior art in the recycling of glass requiring the crushing of such glass structure. Compacting organizations of various types have been utilized as well, wherein U.S. Pat. No. 4,153,206 Haefner sets forth a glass crushing structure of a type typified in the prior art.

U.S. Pat. Nos. 4,373,435 and 3,946,953 are further examples of glass crushing structure.

Accordingly, it may be appreciated that there continues to be need for a new and improved portable glass crushing apparatus as set forth by the instant invention which addresses both the problems of ease of use as well as effectiveness in construction not addressed by the prior art and in this respect, the present invention substantially fulfills this need.

SUMMARY OF THE INVENTION

In view of the foregoing disadvantages inherent in the known types of glass crushing apparatus now present in the prior art, the present invention provides a portable glass crushing apparatus wherein the same is arranged for mounting to a receiving container. As such, the general purpose of the present invention, which will be described subsequently in greater detail, is to provide a new and improved portable glass crushing apparatus which has all the advantages of the prior art glass crushing apparatus and none of the disadvantages.

To attain this, the present invention provides a receiving container including a lid plate thereon mounting a cylindrical receiving tube, with the cylindrical receiving tube including rotating blade members to effect crushing of glass jars and the like directed through the receiving tube from a delivery chute, with the delivery chute including a chute cover. The container may be formed of replaceable configuration to permit removal of the lid plate relative to the receiving container for selective filling of a plurality of such receiving containers.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who art not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable glass crushing apparatus which has all the advantages of the prior art glass crushing apparatus and none of the disadvantages.

It is another object of the present invention to provide a new and improved portable glass crushing apparatus which may be easily and efficiently manufactured and marketed.

It is a further object of the present invention to provide a new and improved portable glass crushing apparatus which is of a durable and reliable construction.

An even further object of the present invention is to provide a new and improved portable glass crushing apparatus which is susceptible of a low cost of manufacture with regard to both materials and labor, and which accordingly is then susceptible of low prices of sale to the consuming public, thereby making such portable glass crushing apparatus economically available to the buying public.

Still yet another object of the present invention is to provide a new and improved portable glass crushing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a lid structure of the invention.

FIG. 2 is an orthographic view, taken along the lines 2—2 of FIG. 1 in the direction indicated by the arrows.

FIG. 3 is an isometric illustration in exploded view of the striking blades associated with the lid structure of FIG. 1.

DESCRIPTION OF THE PREFERRED EMBODIMENT

Figure 4:
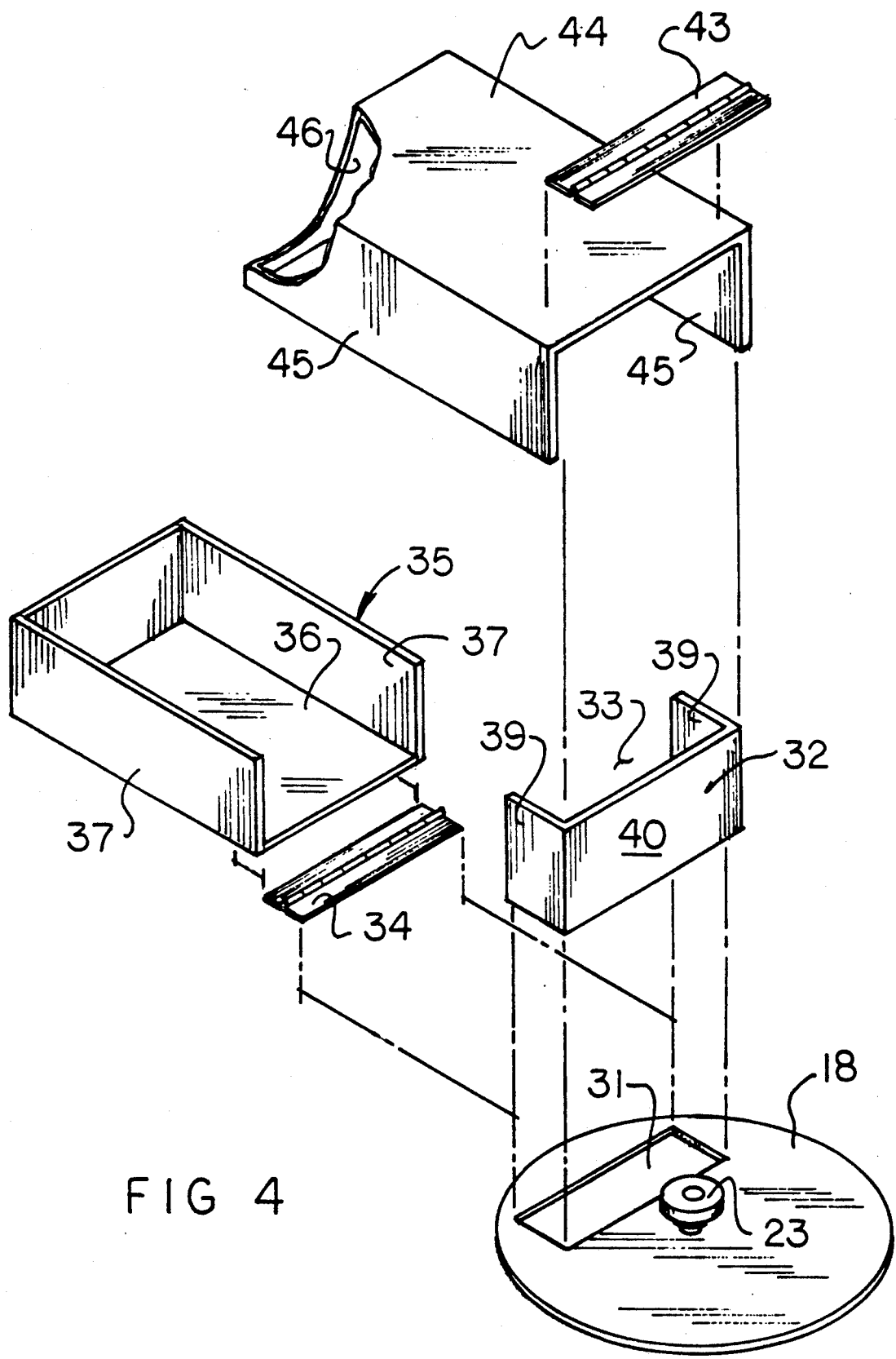
FIG. 4 is an isometric illustration of the delivery chute and lid structure.
Figure 5:
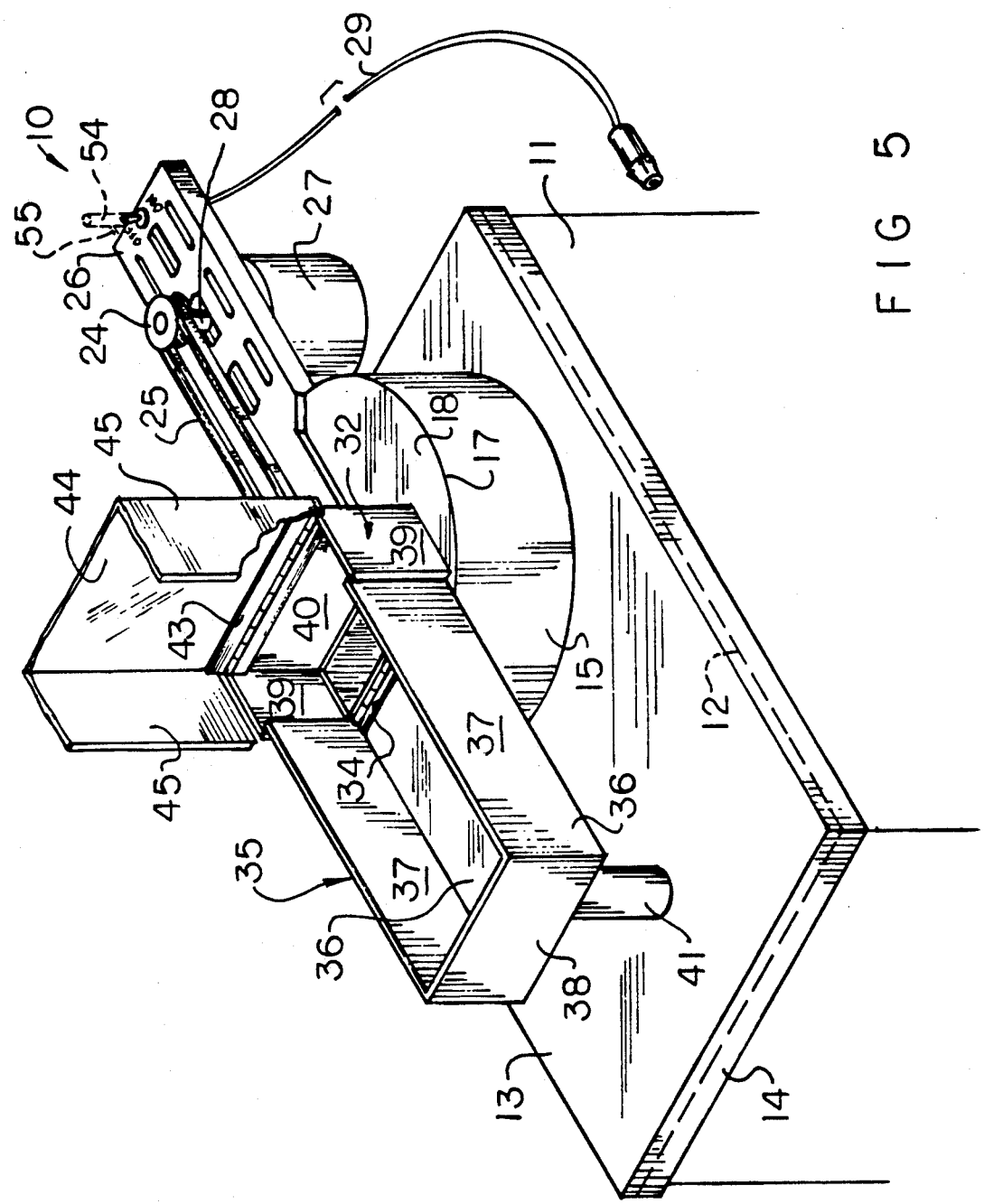
FIG. 5 is an isometric illustration of the invention in assembled configuration.

With reference now to the drawings, and in particular to FIGS. 1 to 5 thereof, a new and improved portable glass crushing apparatus embodying the principles and concepts of the present invention and generally designated by the reference numeral 10 will be described.

More specifically, the portable glass crushing apparatus 10 of the instant invention essentially comprises a receiving container 11 having a container upper continuous edge 12. A lid plate 13 (see FIG. 1) is positioned in continuous communication with the upper continuous edge 12, with the lid plate 13 further including a skirt 14 directed orthogonally and downwardly relative to an outer periphery of the lid plate 13 to effect encircling surroundment of the upper continuous edge 12 in positioning of the lid plate 13 relative to the receiving container 11. A cylindrical receiving tube 15 is fixedly and orthogonally mounted to the top surface of the lid plate 13 projecting upwardly thereof and coaxially aligned relative to a lid plate bore 16. The receiving tube 15 is arranged in a surrounding relationship relative to the lid plate bore 16. The receiving tube has a tube upper edge 17 to receive a receiving tube upper edge cap plate 18 in continuous communication with the receiving tube upper edge 17. The cap plate includes a cap plate central bore 19 coaxially aligned with the lid plate bore 16 and the cylindrical receiving tube 15. The central bore 19 has an axle shaft 20 rotatably mounted therethrough formed with a support flange 21 at a lower end of the axle shaft 20, with the support flange 21 including a plurality of rigid striker blades 22 fixedly mounted to the support flange 21 in a parallel relationship relative to and below the cap plate 18. The rigid striker blades 22 extend radially beyond the outer periphery of the support flange 21, as illustrated in the FIG. 3 for example. An axle shaft pulley 23 is fixedly mounted to the axle shaft 20 above the cap plate 18, with the axle shaft pulley 23 aligned with the drive pulley 24 having a continuous drive belt 25 extending therebetween. A support plate 26 is mounted fixedly to a top surface of the cap plate 18 and extending beyond the periphery of the cap plate 18 in a parallel relationship thereto. The support plate 26 includes the drive pulley 24 mounted to an upper distal end of a drive motor output shaft 28 of a drive motor 27, that in turn is fixedly mounted to the support plate 26 below the support plate 26, as illustrated in FIG. 3. It should be noted that the drive motor output shaft 28 is oriented parallel to the axis 15a of the receiving tube 15 that in turn is coaxially aligned relative to the axle shaft pulley 23. Electric power supply 29 to employ alternating current or direct current as required is operative through an on/off switch 30 in well known manners of supplying electricity to an associated electrical drive motor 27.

The cap plate 18 is formed with a cap plate entrance opening 31 directed therethrough positioned in adjacency to the axle shaft 20 to overlie the rigid striker blades 22. A U-shaped diverter shield 32 is fixedly mounted to a top surface of the cap plate 18 having a concave cavity 33 arranged about the entrance opening, with a first hinge 34 mounted to the cap plate 18 adjacent the entrance opening 18 on opposed side entrance openings relative to the diverter shield 32. The first hinge includes a delivery chute 35 mounted thereto. The delivery chute 35 includes a delivery chute floor having a delivery chute floor forward end mounted to the first hinge 34. The floor 36 includes delivery chute side walls 37 and a delivery chute rear wall 38. A diverter shield 33 includes diverter shield side walls 39 receiving the delivery chute side walls 37 therebetween, and a diverter shield base wall 40 orthogonally mounted extending between the delivery chute side walls 39, with the base wall including a second hinge 43 secured at an upper distal end of the diverter shield base wall 40. An abutment boss 41 is orthogonally mounted to a top surface of the cap plate 18 spaced from the entrance opening a second length that is less than the first length defined by the delivery chute floor 36 to provide for abutment of the delivery chute thereon to permit loading a delivery chute with glass components, whereupon lifting of the delivery chute directs such components into the entrance opening confined within the diverter shield 32 and a chute cover 42 that is mounted to the second hinge 43. The chute cover 42 includes a top wall 44 having its forward end mounted to the second hinge, with chute cover side walls 45 and a chute cover rear wall 46 complementarily receiving the delivery chute 35 therewithin to provide for containment of glass components to be directed through the entrance opening upon lifting of the delivery chute 35 and the chute cover 44 from a first position parallel to the cap plate 18 to a second position orthogonally oriented relative to the cap plate.

The FIG. 1 notes further that a dust collection structure to minimize air-borne dust resultant from the crushing procedure is provided, with a fan housing 50 containing a fan member therewithin is arranged to receive and direct air from below the plate 13 through a plurality of apertures 51, or alternatively a single bore underlying the fan housing. Such air is directed through a conduit 52 into a porous dust collection bag 53. Typical dimensions for use, but not limited thereto, is the fan housings typically of seven inches high and of a diameter of substantially six inches directed to a two inch conduit 52 within a porous bag 53 of any convenient dimensional construction. The porous air bag may be directed to project exteriorly or overlying the lid plate 13.

It should be noted that the instant invention is arranged to accommodate conventional structure to enhance longevity of the components of the organization such as the use of a shaft mounted to the support plate 26 to provide counter-force for stress directed onto the output shaft 28 of the drive motor. Such counter-shaft 54 is indicated in phantom in FIG. 5 and arranged to employ an adjustable linkage 55 cooperative between a counter-shaft 54 and a plate mounted to the output shaft 28, either below or above the pulley 24, to provide for a counter-force relative to belt tensioning and biasing of the belt 25 relative to the drive motor output shaft 28.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable glass crushing apparatus, comprising,
   a receiving container, the receiving container including a receiving container upper continuous edge, and
   a lid plate, the lid plate arranged in contiguous communication relative to the upper continuous edge, with the lid plate having a lid plate skirt extending downwardly relative to the lid plate arranged in surrounding relationship relative to the upper continuous edge, with the lid plate arranged for selective mounting to the receiving container, and
   a receiving tube fixedly mounted to the lid plate extending upwardly thereof, with the receiving tube defined along a tube axis, and the lid plate having a lid plate bore, with the lid plate bore and the cylindrical receiving tube coaxially aligned along the axis, and
   the receiving tube including a receiving tube upper edge, with a cap plate mounted to the upper edge, the cap plate having an axle shaft rotatably mounted through the cap plate coaxially aligned relative to the axis, the axle shaft including a support flange mounted at a lower end of the axle shaft below the cap plate within the receiving tube, with the support flange having a plurality of rigid striker blades fixedly mounted to the support flange, with the striker blades oriented above the lid plate and below the receiving tube upper edge, and
   an axle pulley mounted to an upper end of the axle shaft above the cap plate, and
   a support plate fixedly mounted to the cap plate extending laterally beyond the cap plate in a parallel relationship, with the support plate including a drive motor mounted below the support plate spaced from the lid plate and the receiving tube, with the drive motor including a drive motor output shaft directed through the support plate, and the support plate further including a drive pulley mounted to the drive motor output shaft above the support plate, and a continuous belt mounted between the drive pulley and the axle pulley, with the drive motor arranged for selective actuation to effect rotation of the striker blades, and
   a cap plate entrance opening directed through the cap plate in adjacency to the axis to receive glass components therethrough for crushing of such glass components.

2. An apparatus as set forth in claim 1 wherein the cap plate entrance opening includes a first side and a second side, the first side includes a U-shaped diverter shield mounted in continuous communication to the first side orthogonally mounted to the cap plate extending upwardly thereof, wherein the diverter shield includes diverter shield spaced parallel side walls and a diverter shield base wall, and a first hinge mounted to the cap plate adjacent the entrance opening second side, and a delivery chute, the delivery chute including a delivery chute floor, the delivery chute floor including a floor forward edge, with the floor forward edge mounted to the first hinge, and the delivery chute including delivery chute side walls received between the diverter shield side walls, and a delivery chute rear wall spaced from the entrance opening.

3. An apparatus as set forth in claim 2 wherein the diverter shield includes a second hinge mounted to the diverter shield base wall at an upper distal end of the base wall spaced from the cap plate, and a chute cover, the chute cover including a chute cover top wall, with the chute cover top wall including a chute cover top wall forward end, the chute cover top wall forward end mounted to the second hinge, the chute cover including chute cover side walls and a chute cover rear wall spaced from the chute cover forward end, with the chute cover arranged for complementarily receiving the delivery chute therewith.

* * * * *